(12) United States Patent
Nedovic et al.

(10) Patent No.: US 10,187,094 B1
(45) Date of Patent: *Jan. 22, 2019

(54) SYSTEM AND METHOD FOR REFERENCE NOISE COMPENSATION FOR SINGLE-ENDED SERIAL LINKS

(71) Applicant: NVIDIA Corporation, Santa Clara, CA (US)

(72) Inventors: Nikola Nedovic, San Jose, CA (US); Brian Matthew Zimmer, Berkeley, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,647

(22) Filed: Jan. 26, 2018

(51) Int. Cl.
*H04B 1/10* (2006.01)
*H04L 5/00* (2006.01)
*H04B 1/04* (2006.01)
*H04B 1/16* (2006.01)

(52) U.S. Cl.
CPC ............ *H04B 1/10* (2013.01); *H04B 1/0475* (2013.01); *H04B 1/16* (2013.01); *H04L 5/0048* (2013.01)

(58) Field of Classification Search
CPC ...... H04B 1/10; H04B 1/1009; H04B 1/1027; H04B 1/1045; H04B 1/12; H04B 1/123; H04B 1/0475; H04B 1/16; H04B 15/00; H04B 15/02; H04L 5/0048
See application file for complete search history.

(56) References Cited

U.S. PATENT DOCUMENTS

| | | | |
|---|---|---|---|
| 6,826,390 B1 | 11/2004 | Tamura | |
| 7,456,650 B2 | 11/2008 | Lee | |
| 7,561,810 B2 | 7/2009 | Noguchi et al. | |
| 8,824,700 B2 | 9/2014 | Kanamori et al. | |
| 8,861,663 B1 | 10/2014 | Sedarat et al. | |
| 9,306,654 B2 * | 4/2016 | Hwang | H04B 7/0877 |
| 9,564,879 B1 | 2/2017 | Luo et al. | |
| 9,673,849 B1 * | 6/2017 | Paraschou | H04B 1/10 |
| 9,819,388 B2 | 11/2017 | Flowers et al. | |
| 2004/0106381 A1 | 6/2004 | Tiller | |
| 2005/0063553 A1 * | 3/2005 | Ozawa | H04R 3/005 381/92 |
| 2006/0165185 A1 | 7/2006 | Daily et al. | |

(Continued)

OTHER PUBLICATIONS

Nedovic et al., U.S. Appl. No. 15/881,661, filed Jan. 26, 2018.
Non-Final Office Action from U.S. Appl. No. 15/881,661, dated Aug. 24, 2018.

*Primary Examiner* — Siu M Lee
(74) *Attorney, Agent, or Firm* — Zilka-Kotab, P.C.

(57) ABSTRACT

A single-ended signal transmission system recovers a noise signal associated with a data input signal and uses the recovered noise signal to compensate for noise on the data input signal. The noise signal may be recovered from a noise reference signal line, or clock signal line, or a data signal line associated with a DC-balanced data input signal. The recovered noise signal may be represented as an analog signal or a digital signal. The recovered noise signal may be processed to compensate for DC offset and nonlinearities associated with one or more different input buffers. In one embodiment, the recovered noise signal includes frequency content substantially below a fundamental frequency for data transmission through the data input signal.

20 Claims, 18 Drawing Sheets

(56) References Cited

U.S. PATENT DOCUMENTS

| | | |
|---|---|---|
| 2007/0117511 A1 | 5/2007 | Kwon et al. |
| 2009/0108891 A1 | 4/2009 | Sander et al. |
| 2010/0321119 A1 | 12/2010 | Wu et al. |
| 2012/0183031 A1* | 7/2012 | Kolze .............. H04B 1/10 375/224 |
| 2012/0200348 A1 | 8/2012 | Mulvaney |
| 2013/0307607 A1* | 11/2013 | Oh .............. H03K 3/013 327/384 |
| 2015/0162952 A1* | 6/2015 | Hollis .............. H04B 3/487 370/201 |
| 2017/0170870 A1 | 6/2017 | Chen |

* cited by examiner

SYSTEM AND METHOD FOR REFERENCE NOISE COMPENSATION FOR SINGLE-ENDED SERIAL LINKS

FIELD OF THE INVENTION

The present invention relates to high-speed data links, and more particularly to systems and methods for reference noise compensation for single-ended serial links.

BACKGROUND

In modern data processing systems, high-speed data links provide data communication paths between central processing units (CPUs), graphics processing units (GPUs), memory modules, peripheral device interfaces, network interfaces, and other system components. A high-speed data link may serialize a wide parallel data path into a smaller number of serial links. High-speed data links commonly implement differential signaling, which encodes a logical state for one data signal as a voltage difference between a pair of physical signals. A high-speed data link may include an arbitrary number of data signals, each with two physical signals to form a differential pair. While differential signaling is highly tolerant of noise, two physical signals (wires, pins, bumps, etc.) are required along the entire path from transmitter to receiver for each data signal, limiting area and power efficiency.

Single-ended signaling encodes one data signal on a single physical signal that includes an implicit reference, such as a local ground reference. A transmitter circuit may transmit a physical signal referenced to a local transmitter ground, while a receiver circuit may receive the physical signal as a voltage signal referenced to a local receiver ground. At the receiver, the voltage signal may include relative noise between the local transmitter ground and the local receiver ground, as well as noise coupled to the physical signal in transit. At relevant high speeds, such noise can significantly erode signal integrity for many useful applications of high-speed single-ended signaling. There is a need for addressing these issues and/or other issues associated with the prior art.

SUMMARY

In one embodiment, the transmitter circuit is configured to transmit a single-ended DC balanced signal on a first channel. Furthermore, the receiver circuit is configured to receive the single-ended DC balanced signal combined with reference noise on the first channel, sample the single-ended DC balanced signal combined with the reference noise to extract the reference noise, and combine the reference noise and the single-ended DC balanced signal combined with the reference noise to restore the single-ended DC balanced signal.

In another embodiment, the transmitter circuit is configured to transmit a reference signal on a first channel, and transmit a single-ended signal on a second channel. Furthermore, the receiver circuit is configured to receive the reference signal combined with first noise on the first channel, receive the single-ended signal combined with second noise on the second channel, sample the reference signal combined with the first noise to determine the first noise, and combine the first noise and the single-ended signal combined with the second noise to restore the single-ended signal.

A circuit and system are disclosed for single-ended signal transmission. The single-ended signal transmission system comprises at least one instance of the transmitter circuit and at least one instance of the receiver circuit. The system may comprise a processing unit such as a graphics processing unit (GPU).

DETAILED DESCRIPTION

Figure 1A:
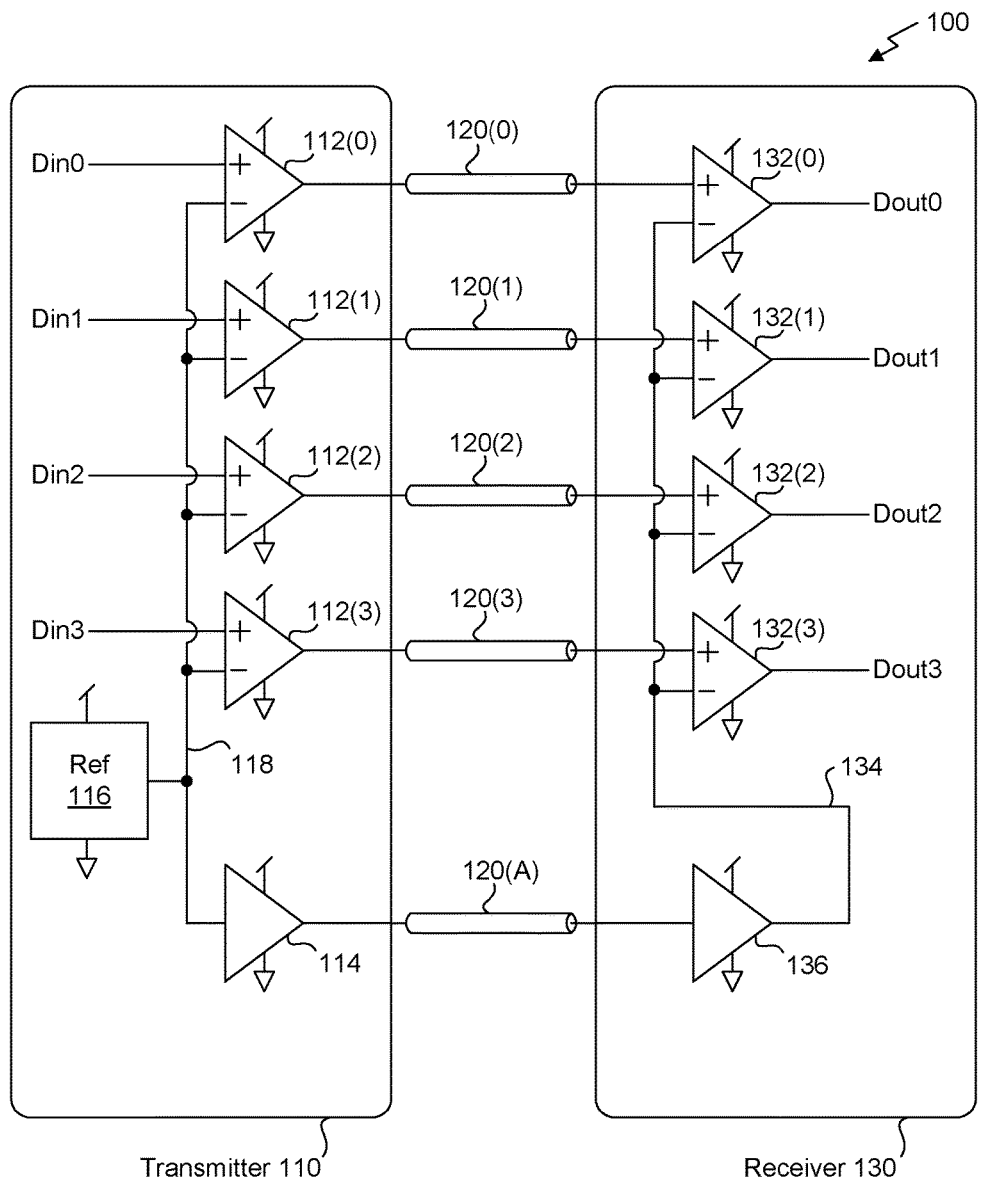
FIG. 1A illustrates a transmitter circuit and receiver circuit configured to provide reference forwarding, in accordance with one embodiment.

Embodiments of the present disclosure include a receiver circuit configured to compensate for noise introduced into a single-ended signal transmitted to the receiver circuit along a channel. The channel may be provided by an electrically conductive path from a transmitter circuit to the receiver circuit. A single-ended signal is transmitted from the transmitter circuit to the receiver circuit. In a practical setting, a noise signal is introduced into the single-ended signal, leading to the single-ended signal becoming noisy. In various embodiments, the introduced noise signal is extracted from the noisy single-ended signal to generate a compensation signal (e.g., a ground noise compensation), and the compensation signal is used to remove noise (e.g., through subtraction) from the noisy single-ended signal to restore (i.e., replicate) the originally transmitted single-ended signal.

In one embodiment, a separate reference signal is transmitted through a dedicated channel along with one or more lanes of data in a data bus. In such a configuration, a noise signal introduced into the lanes of the data bus and the reference signal may be substantially identical, so that the noise signal in the separate reference signal is representative of the noise in each lane of the data bus. The noise signal may be extracted from the reference signal and used to generate the compensation signal for removing noise in the data bus signals. In one embodiment, the reference signal is a fixed voltage signal. In another embodiment, the reference signal is a clock signal. In yet another embodiment, an imbalance in a DC-balanced signal provides the compensation signal. In such an embodiment, a separate reference signal need not be transmitted. A DC-balanced signal transmits an equal number of logic high values and logic low values (i.e., ones and zeros) over time so that the average signal level is midway between the logic high and logic low. For example, a clock signal having a 50/50 duty cycle is a DC-balanced signal.

Several different embodiments are disclosed for sampling a transmitted reference signal and/or a DC-balanced signal to generate the compensation signal (or signals). A given compensation signal may be combined with a data signal of the data bus to remove noise and restore the data signal to better represent an originally transmitted signal. Various embodiments advantageously allow greater distance (or reduced amplitude for reduced power) for a single-ended signal to be transmitted from a transmitter circuit to a receiver circuit without incurring a bit error rate penalty compared to prior art solutions.

In certain scenarios, the noise signal has a frequency range that is lower than a clock frequency for the data signal(s). For example, the data signals may have a clock frequency of over 10 GHz, while the noise signal may include energy that primarily falls well below 1 GHz. As such a given noise signal causes an incoming signal at the receiver circuit to have a potentially large, superimposed envelope that tracks the noise signal. As such, the noise signal can severely degrade signal integrity of the data signals.

In the context of the following description, the term signal is not limited to a physical signal or waveform transmitted through a physical interconnect, such as a wire or trace on a printed circuit board, multi-chip substrate, or within an integrated circuit. In one embodiment, a signal may be embedded or encoded with a clock signal or data signal that is transmitted on a physical interconnect. For example, a compensation signal may be a voltage signal or a digital representation of a voltage signal.

FIG. 1A illustrates a transmitter circuit 110 and receiver circuit 130 configured to provide reference forwarding, in accordance with one embodiment. As shown, a single-ended signal transmission system 100 comprises the transmitter circuit 110 coupled to the receiver circuit 130 through a set of interconnects 120. Each interconnect 120 may include a bonding pad, a bonding bump, a wire (e.g., a printed circuit board trace), and any other technically feasible elements for electrically conveying a signal from the transmitter circuit 110 to the receiver circuit 130.

As shown, input data signals Din0, Din1, Din2, and Din3 (a four lane data bus) are transmitted from the transmitter circuit 110 to the receiver circuit 130, which generates corresponding output data signals Dout0, Dout1, Dout2, and Dout3. The transmitter circuit 110 includes one or more output buffers 112 configured to drive an output signal voltage relative to a transmitter reference signal 118. A given output buffer 112 receives a data input signal (e.g., Din0, Din1, Din2, and Din3) and drives the logical state of the data input signal in the form of a transmitted data signal. Each transmitted data signal is transmitted through an associated interconnect 120 to an input buffer 132. The input buffer 132 reconstructs the data input signal to generate a data output signal (e.g., Dout0, Dout1, Dout2, and Dout3). The reference forwarding approach shown in FIG. 1A requires N+1 interconnects 120 for N data lanes.

The transmitter reference signal 118 is generated by a reference circuit 116. In a simple implementation, the transmitter reference signal 118 is a local transmitter ground node or local AC ground node. An output buffer 114 transmits the transmitter reference signal 118 to an input buffer 136 within the receiver circuit 130. The input buffer 136 receives the reference signal 118 combined with a first noise associated with transmitting the reference signal 118 to the input buffer 136 (reference noise). The receiver circuit 130 samples the reference signal 118 combined with the first noise as an output of input buffer 136 to determine the first noise. Based on sampling the reference signal 118 combined with the first noise, the receiver circuit 130 generates a compensation signal 134, which may track the transmitter reference signal 118 along with the first noise introduced on the transmitter reference signal 118. In one embodiment, compensation signal 134 is an analog voltage signal. Because the introduced noise is generally uniform for each of the transmitted data signals and the transmitted reference signal, the compensation signal 134 may be used to remove (e.g., through voltage subtraction) the introduced noise from the transmitted data signals (a second noise) arriving at the receiver circuit 130. That is, the receiver circuit 130 combines the first noise and a single-ended data signal, itself combined with the second noise, to restore the single-ended data signal. Any technically feasible circuits may be used to implement the various circuit elements of a single-ended signal transmission system 100.

While the introduced noise is generally uniform, noise at a given input buffer 136 is, strictly speaking, unique to the input buffer 136. As such, a noise signal transmitted by output buffer 114 represents a first noise signal, while noise transmitted by each different output buffer 112 represents a correspondingly different noise signal (second noise). While the noise signals are not strictly equivalent, the first noise signal and each different noise signal are substantially correlated and sufficiently similar to be used as a representation of each other. Furthermore, the representation of the first noise may be in the form of an analog signal (e.g. a voltage), a differential analog signal, or a digital signal (e.g., a digital encoding).

Figure 1B:
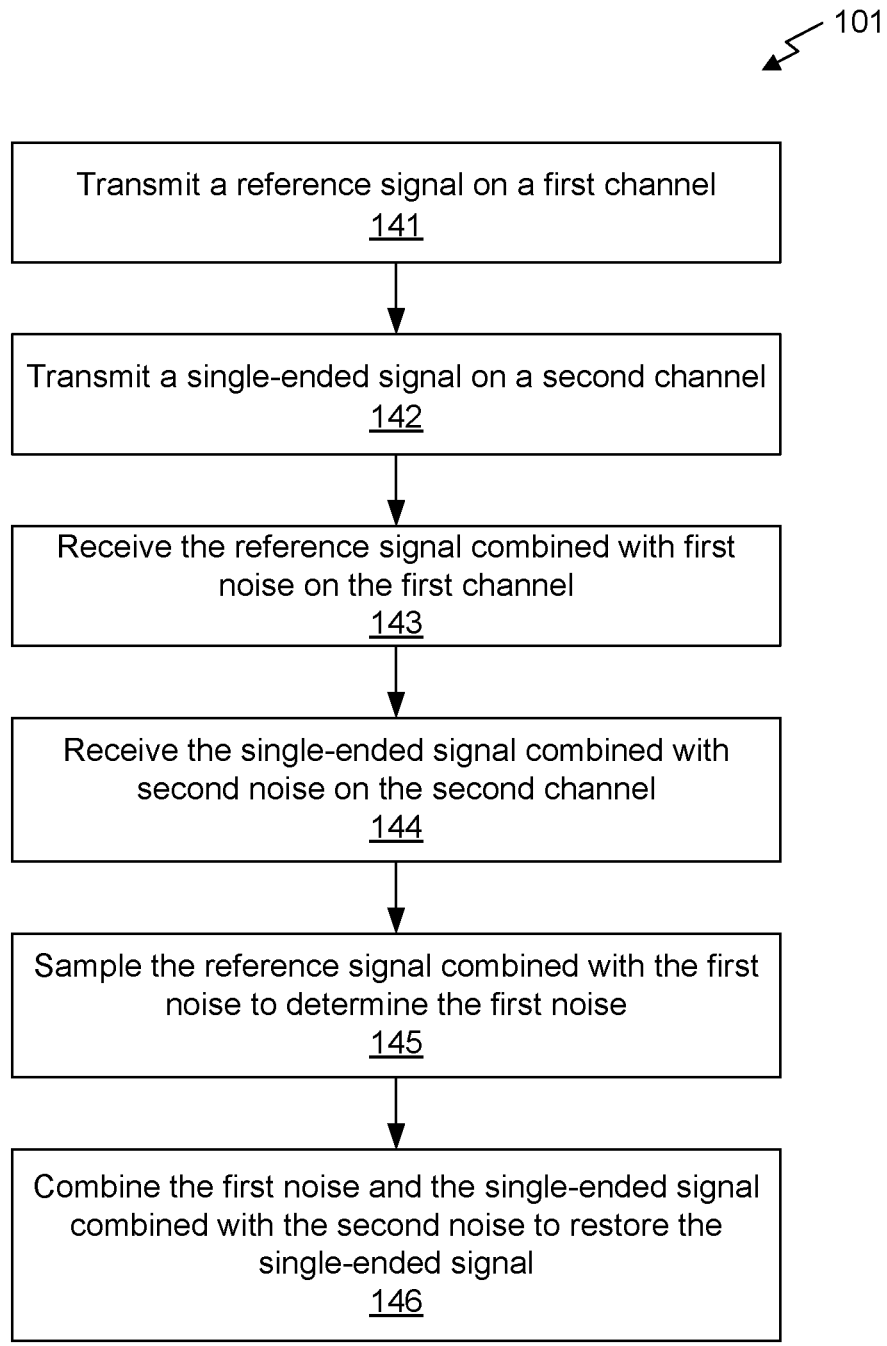
FIG. 1B is a flowchart of a method for transmitting data as a single-ended signal, in accordance with one embodiment.

FIG. 1B is a flowchart of a method 101 for transmitting data as a single-ended signal, in accordance with one embodiment. Although the method 101 is described in conjunction with the systems of FIGS. 1A, 5A-5D, and 6, any system that implements method 101 is within the scope and spirit of embodiments of the present invention. In one embodiment, method 101 is implemented by a transmitter circuit, such as transmitter circuit 110 FIG. 1A. Data may be received by a receiver circuit, such as data receiver circuit 130 of FIG. 1A. In general, transmitter circuit 110 is configured to drive a reference signal through a first channel comprising set of interconnects 120, and a data signal through a second channel for transmission to a receiver circuit 130. The receiver circuit 130 is configured to restore the data signal based on the reference signal.

At step 141, transmitter circuit 110 transmits a reference signal on a first channel. In one embodiment, the reference signal is transmitted by output buffer 114 through the first channel comprising interconnect 120(A). At step 142, transmitter circuit 110 transmits a single-ended signal on a second channel. In one embodiment, the single-ended signal is transmitted by output buffer 112(0) through the second channel comprising interconnect 120(0).

At step 143, receiver circuit 130 receives the reference signal combined with first noise on the first channel. At step 144, receiver circuit 130 receives the single-ended signal combined with second noise on the second channel. At step 145, receiver circuit 130 samples the reference signal combined with the first noise to determine the first noise. At step 146, receiver circuit 130 combines the first noise and the single-ended signal combined with the second noise to restore the single-ended signal.

Figure 1C:
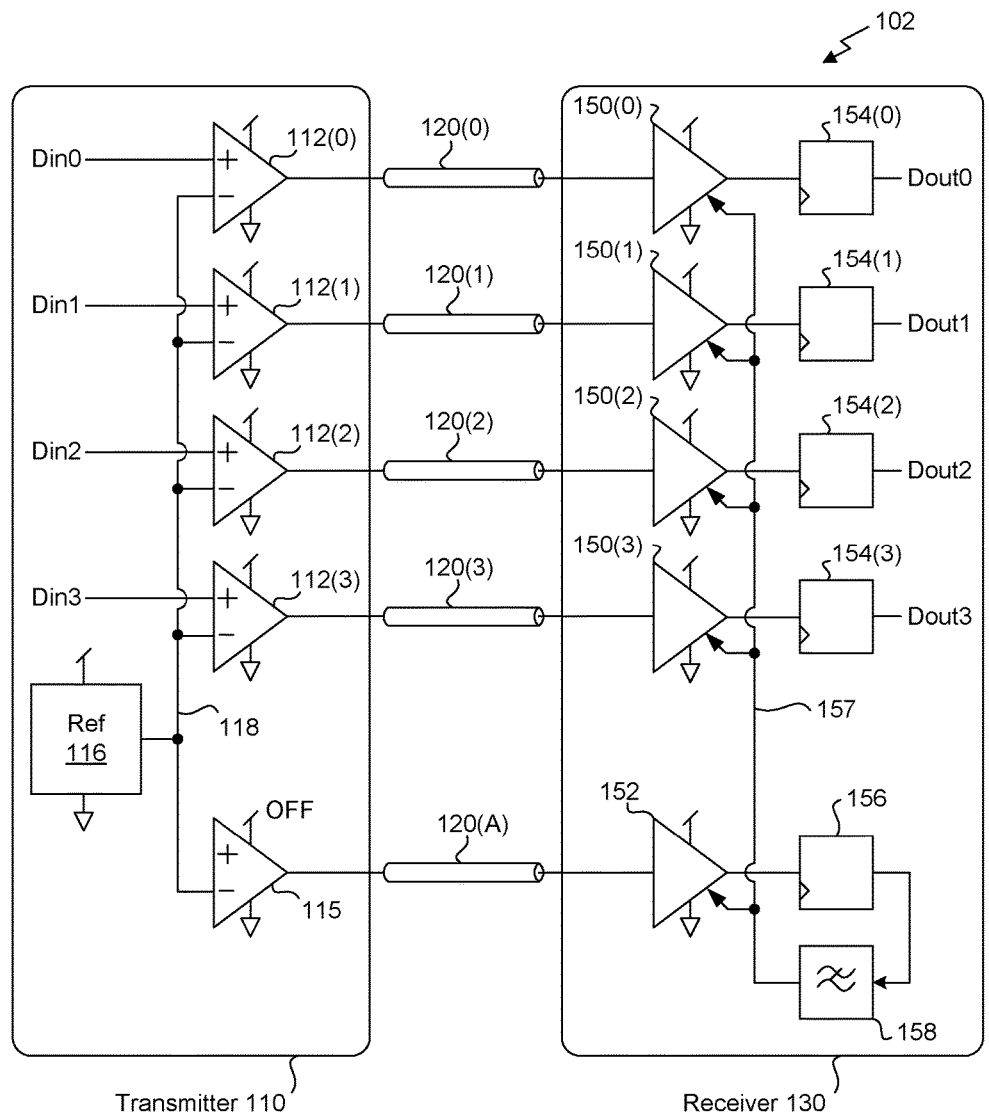
FIG. 1C illustrates a transmitter circuit and receiver circuit configured to provide reference forwarding with feedback correction, in accordance with one embodiment.

FIG. 1C illustrates a transmitter circuit 110 and receiver circuit 130 configured to provide reference forwarding with feedback correction, in accordance with one embodiment. As shown, a single-ended signal transmission system 102 comprises the transmitter circuit 110 coupled to the receiver circuit 130 through a set of interconnects 120. In single-ended signal transmission system 102, the transmitter circuit 110 is modified relative to single-ended signal transmission system 100 of FIG. 1A. Specifically, the transmitter circuit 110 is modified to include output buffer 115, which may comprise an instance of an output buffer 112. In one embodiment, output buffer 115 may be configured in an off state, during which time no signal is transmitted. Despite being turned off, output buffer 115 presents a similar impedance to interconnect 120(A) as output buffers 112(0)-112(3) present to interconnects 120(0)-120(3), respectively, thereby preserving noise similarity across all interconnects 120.

Furthermore, the receiver circuit 130 is modified to include input buffers 150 and 152 that are configured to receive a digital compensation signal 157 rather than input buffers 132 that are configured to receive the analog compensation signal 134. The digital compensation signal 157 provides a digital encoding of a noise compensation signal. In one embodiment, the encoding implements a "thermometer" code, also referred to in the art as a "unary" code. Such codes are robust with respect to bridging asynchronous boundaries and producing glitch-free changes in value. The output of input buffer 152 is sampled by sampler circuit 156 and filtered by filter 158.

In one embodiment filter 158 is a low pass filter (as shown). Furthermore, filter 158 may include an integrator function which may be implemented in either an analog or digital domain. In one embodiment, filter 158 may provide a programmable cut-off frequency. For example, filter 158 may provide a programmable cut-off frequency ranging from 50 MHz to 1 GHz. The output of filter 158 is a digital representation of noise introduced on the reference signal transmitted by output buffer 115. The introduced noise and transmitted noise comprises reference noise. The reference noise is processed before being combined with a second noise signal associated with the single-ended data signals at input buffers 150. In the present example, the reference noise is processed according to a transfer function of filter 158. Furthermore, the transfer function may be programmable.

A set of sampler circuits 154 are configured to synchronously capture data at the outputs of input buffers 150 to generate data output signals (e.g., Dout0, Dout1, Dout2, and Dout3). In one embodiment, the sampler circuits 154 are flip-flop circuits. In one embodiment, sampler circuit 156 uses an uncorrelated clock relative to the sampler circuits 154. For example, sampler circuit 156 may operate at a clock that is approximately ten percent different in frequency than the clock used by sampler circuits 154.

In the absence of reference noise, the output of the input buffer 152 should be zero, i.e. the voltage whose resolution by the sampler 156 should be metastable; or, after the metastability resolution, its output should result in an equal number of ones and zeroes. In this scenario, the correction signal 157 is equal or approximately equal to zero, thus making no or almost no contribution to the buffers 150, and the link operates as if the reference noise compensation is absent or disabled. In the presence of reference noise, the output of input buffer 152 can be used as an error signal to drive a control loop comprising the input buffer 152, the sampler 156 and the filter 158. The control loop modulates the input buffer 152 front-end to drive the error signal to zero, or in general, to attenuate the error signal by the amount equal to the loop gain, which can be made arbitrarily large over a range of frequencies. The same digital compensation signal 157 is distributed to all other input buffers 150, therefore compensating the input buffers 150 according to the reference noise signal. This control loop can be configured to have a high bandwidth, allowing for a wide noise rejection band.

In links in which some or all transmitted signals do not occupy some portion of frequency spectrum, a more resource-efficient technique may be implemented for communicating the transmitter reference signal 118. For example, in clock forwarding systems, the clock signal has no significant energy below the fundamental frequency of the clock. Furthermore, in certain DC-balanced data coding systems, each data lane may have no components below a fraction of the Nyquist rate. One example of such a coding system uses 8B/10B per data lane.

At the receiver side in such systems, data content can be filtered out (e.g., using a low-pass filter) and the remaining signal represents a noise signal that may be used for local data recovery. Extraction of a given noise signal and corresponding compensation signal may be performed for each data lane if the data is encoded to be DC-balanced. Alternatively, extraction of a noise signal may be performed on a reference signal (e.g., a clock signal), with the resulting compensation signal used for associated data lanes.

In this way, the reference noise can be tracked up to the bandwidth of the filter used for the receiver reference extraction, at no additional channel or interconnect (e.g., pin/bump/wire) cost. The spectrum of the signal from which the reference noise is extracted determines the achievable reference loop bandwidth, and consequently the performance of the reference noise rejection, because the higher the low cut-off frequency of this signal, the higher the loop bandwidth can be. For this reason, using the clock lane for reference noise extraction and distributing the error signal to data lanes is preferable to a per-lane solution. Examples of using the clock lane for reference noise extraction are illustrated in FIGS. 1D and 1E.

Figure 1D:
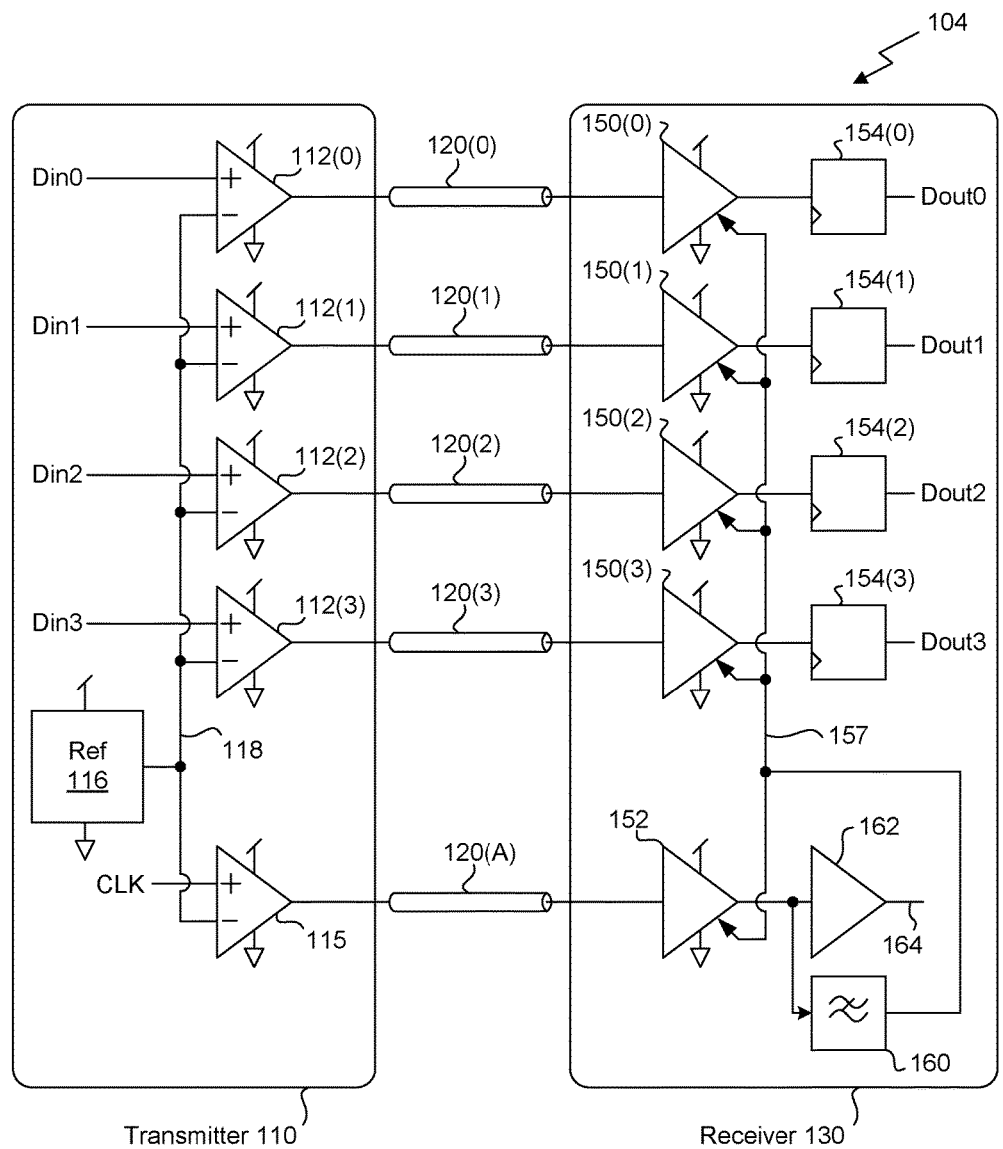
FIG. 1D illustrates a transmitter circuit and receiver circuit configured to provide compensation of reference noise embedded in a DC-balanced signal, in accordance with one embodiment.
Figure 1E:
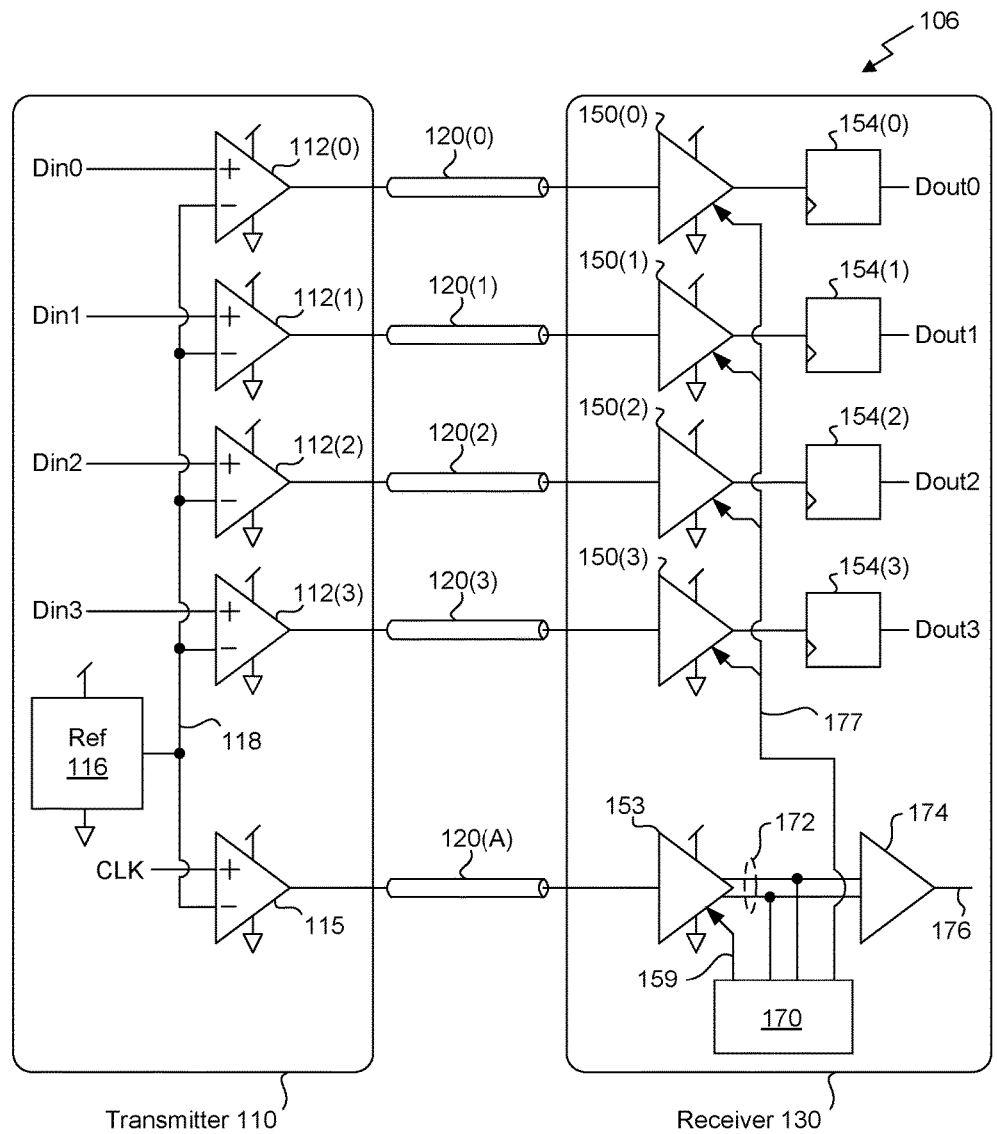
FIG. 1E illustrates a transmitter circuit and receiver circuit comprising a digital reference noise compensation loop with individual lane offset control, in accordance with one embodiment.

FIG. 1D illustrates a transmitter circuit 110 and receiver circuit 130 configured to provide compensation of reference noise embedded in a DC-balanced signal, in accordance with one embodiment. As shown, a single-ended signal transmission system 104 comprises the transmitter circuit 110 coupled to the receiver circuit 130 through a set of interconnects 120. In single-ended signal transmission system 104, the transmitter circuit 110 is modified relative to single-ended signal transmission system 102 of FIG. 1C. Specifically, the output buffer 115 is powered on and configured to receive a reference signal (clock signal CLK). In one embodiment, clock signal CLK is a source clock for a data bus comprising Din0, Din1, Din2, and Din3. Note that a periodic clock signal such as clock signal CLK should be a DC-balanced signal (assuming a properly balanced 50/50 duty cycle). More generally, in other embodiments, output buffer 115 can be configured to transmit any DC-balanced signal.

Furthermore, the receiver circuit 130 is modified to include filter 160, configured to generate the digital compensation signal 157 by filtering the output of input buffer 152. In one embodiment filter 160 is a low pass filter (as shown). Furthermore, filter 160 may include an integrator function which may be implemented in either an analog or digital domain. The filter 160 may also include circuitry for increasing loop stability; for example, filter 160 may include circuitry to generate an appropriate frequency response zero. In one embodiment, filter 160 may provide a programmable cut-off frequency. For example, filter 160 may provide a programmable cut-off frequency ranging from 50 MHz to 1 GHz. The output of filter 160 is a digital representation of reference noise. Filter 160 should substantially filter out (attenuate) the fundamental frequency and harmonics of a clock signal for the DC-balanced signal (e.g., clock signal CLK). In the context of single-ended signal transmission system 104, any DC imbalance (taken over some number of clock cycles) detected by filter 160 in what should be a DC-balanced signal is actually a reference noise signal (the difference between the transmitter reference and the receiver reference). A control loop formed by filter 160 and input buffer 152 may compensate for noise as the noise signal varies by driving a DC imbalance back into a balanced state. The digital compensation signal 157 generated by filter 160 is transmitted to input buffer 152 to close the control loop. Furthermore, digital compensation signal 157 may be transmitted to input buffers 150 to compensate for the noise signal at the input buffers 150.

In one embodiment, a clock buffer 162 is configured to receive the output of input buffer 152 and generate a source clock 164 (forwarded clock). The source clock (e.g., with phase alignment) may be used as a clock for capture circuits 154.

FIG. 1E illustrates a transmitter circuit 110 and receiver circuit 130 comprising a digital reference noise compensation loop with individual lane offset control, in accordance with one embodiment. As shown, a single-ended signal transmission system 106 comprises the transmitter circuit 110 coupled to the receiver circuit 130 through a set of interconnects 120. In single-ended signal transmission system 106, the transmitter circuit 110 is replicated from the single-ended signal transmission system 104 of FIG. 1C. However, the receiver circuit 130 is modified relative to single-ended signal transmission system 104. Specifically, input buffer 152 is replaced with input buffer 153, configured to provide a differential clock signal 172. The differential clock signal 172 is provided to a clock buffer 174, which generates a source clock 176. Furthermore, the differential clock signal 172 is provided to a digital reference noise compensation signal generator circuit 170, which is configured to generate a digital compensation signal 159 and a digital compensation signal set 177 based on the differential clock signal 172. Specifically, the compensation signal generator circuit 170 detects a DC imbalance in the differential clock signal 172 and generates a corresponding error signal that can be used as a compensation signal for compensating for noise being received by input buffer 153. In one embodiment, the digital compensation signal 159 encodes a noise compensation signal transmitted to input buffer 153 (similarly to the digital compensation signal 157) to compensate for noise received by input buffer 153. The digital compensation signal set 177 includes individual digital compensation signals for compensating different input buffers 150.

A control loop is formed by input buffer 153 and the compensation signal generator circuit 170, with digital compensation signal 159 closing the control loop. The control loop is configured to drive a noise signal received by input buffer 153 to zero using digital compensation signal 159. Individualized compensation signals are generated for the different input buffers 150 based on the digital compensation signal 159. The individualized compensation signals together form the digital compensation signal set 177. The individualized compensation signals provide, without limitation, separately calibrated compensation for DC offsets of the different input buffers 150 prior to the normal link operation. Furthermore, input buffers 150 may not respond equivalently and linearly relative to the same compensation signal. Therefore, the individualized compensation signals further provide decoupling of different transfer functions of different input buffers 150 to better track the intended noise compensation effect of the control loop. In one embodiment, DC offset and nonlinearity associated with the input buffers 150 may be pre-characterized prior to normal operation.

Figure 1F:
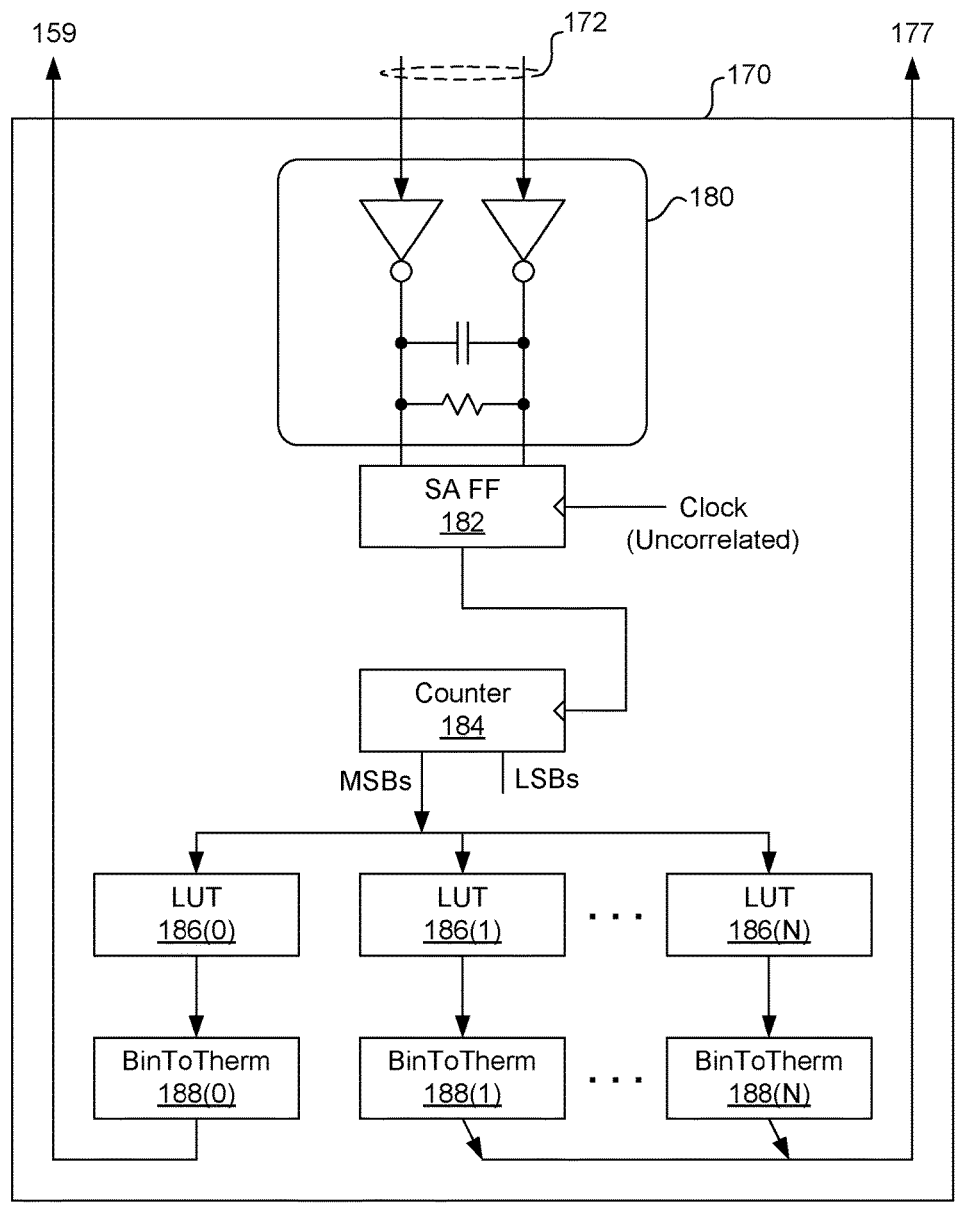
FIG. 1F illustrates a digital reference noise compensation signal generator circuit, in accordance with one embodiment.

FIG. 1F illustrates a digital reference noise compensation signal generator circuit 170, in accordance with one embodiment. The compensation signal generator circuit 170 is configured to detect a DC imbalance in the differential clock signal 172 and to generate a corresponding digital compensation signal 159, along with the digital compensation signal set 177. A low-pass differential buffer 180 receives the differential clock signal 172 and transmits a buffered version of the differential clock signal 172 to a sense amplifier based flip-flop (SA FF) 182. The SA FF 182 should be clocked using an uncorrelated clock relative to the differential clock signal 172. As shown, an output of SA FF 182 is used to clock a counter 184. The counter 184 provides a set of least-significant bits (LSBs) and a set of most-significant bits (MSBs). A plurality of samples may be taken by the SA FF 182 at an appropriate sampling frequency to provide a scaled count of the samples. One technique for scaling is to discard one or more LSBs from the counter. In any one sampling interval, counter 184 may count up to a fixed number, based on a total number of LSBs and MSBs. If a noise signal exceeds the count for a sampling interval, the counter should reach a maximum value and the control loop will respond accordingly, but the control loop will present as being slew-rate (e.g., bandwidth) limited. In one embodiment, the counter 184 is an up/down counter, and an up/down direction is determined by the state of the differential clock signal 172. The output of counter 184 is transmitted to a set of look-up tables (LUTs) 186. Each LUT 186 may be configured to account for a DC offset and/or non-linearity for an associated input buffer 150. Such DC offset and/or non-linearity may be characterized prior to normal operation. In this way, each LUT 186 implements a transfer function for a corresponding input buffer 150 or input buffer 153. In one embodiment, LUTs 186 are programmable.

Conceptually, the output of each LUT 186 is coupled to the input of a binary to thermometer converter (BinToTherm) 188. In one embodiment, the LUTs 186 and the BinToTherm converters 188 are implemented as separate circuits. In alternative embodiments, the function of the LUTs 186 and the BinToTherm converters 188 may be combined. In one embodiment the thermometer code encodes at least sixteen levels.

While one implementation of compensation signal generator circuit 170 is shown here, other implementations may be applicable in other embodiments. For example, a microcontroller or programmable signal processor may be used to implement compensation signal generator circuit 170. The programmable signal processor may provide programmable transfer functions. Furthermore, alternative logic may be implemented to detect a DC imbalance in the differential clock signal 172 and to generate a corresponding digital compensation signal 159 and/or digital compensation signal set 177.

Figure 1G:
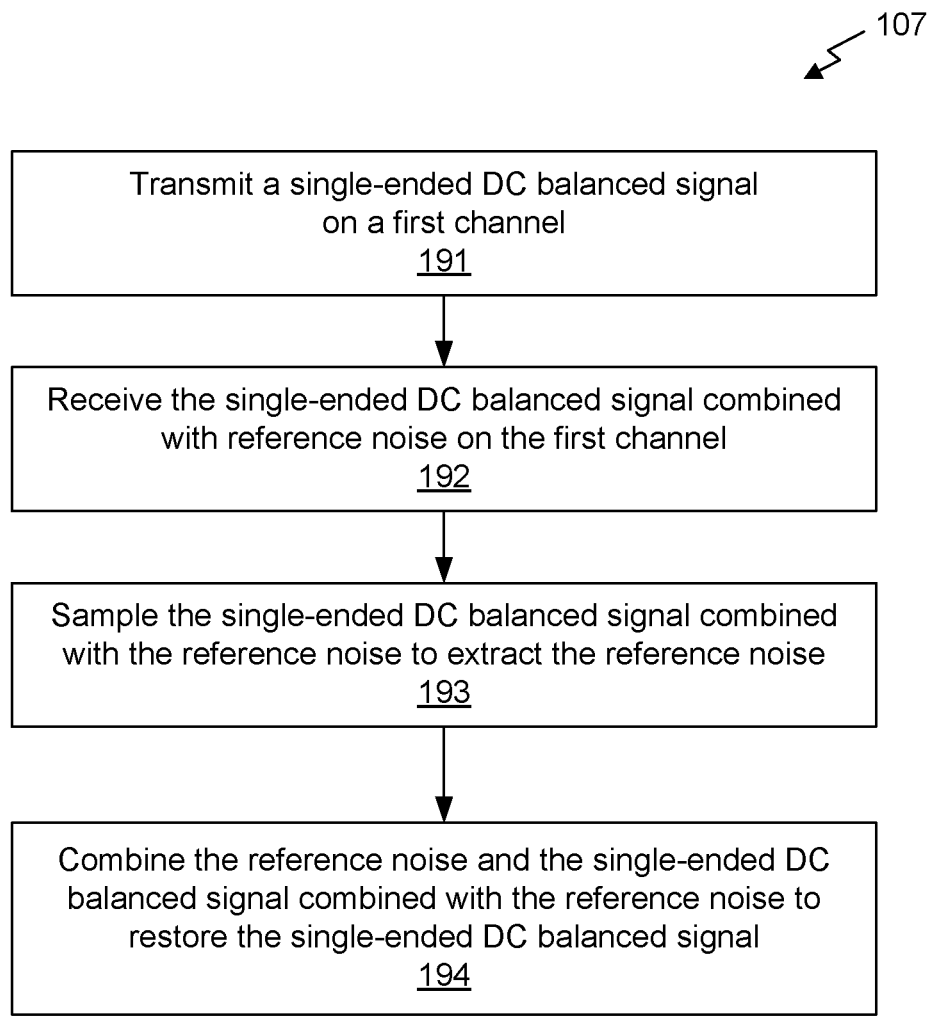
FIG. 1G is a flowchart of a method for transmitting data as a single-ended signal, in accordance with one embodiment.

FIG. 1G is a flowchart of a method 107 for transmitting data as a single-ended signal, in accordance with one embodiment. Although the method 107 is described in conjunction with the systems of FIGS. 1C-1F, 5A-5D, and 6, any system that implements method 107 is within the scope and spirit of embodiments of the present invention. In one embodiment, method 107 is implemented by a transmitter circuit, such as transmitter circuit 110 FIGS. 1E-1F. Data may be received by a receiver circuit, such as data receiver circuit 130 of FIG. 1E-1F. In general, transmitter circuit 110 is configured to drive a reference signal through a first channel comprising set of interconnects 120, and a data signal through a second channel for transmission to a receiver circuit 130. The receiver circuit 130 is configured to restore the data signal based on the reference signal.

At step 191, transmitter circuit 110 transmits a single-ended DC balanced signal on a first channel. In one embodiment, the single-ended DC balanced signal comprises a clock signal.

At step 192, receiver circuit 130 receives the single-ended DC balanced signal combined with reference noise on the first channel. At step 193, receiver circuit 130 samples the single-ended DC balanced signal combined with the reference noise to extract the reference noise. At step 193, receiver circuit 130 combines the reference noise and the single-ended DC balanced signal combined with the reference noise to restore the single-ended DC balanced signal.

Figure 2:
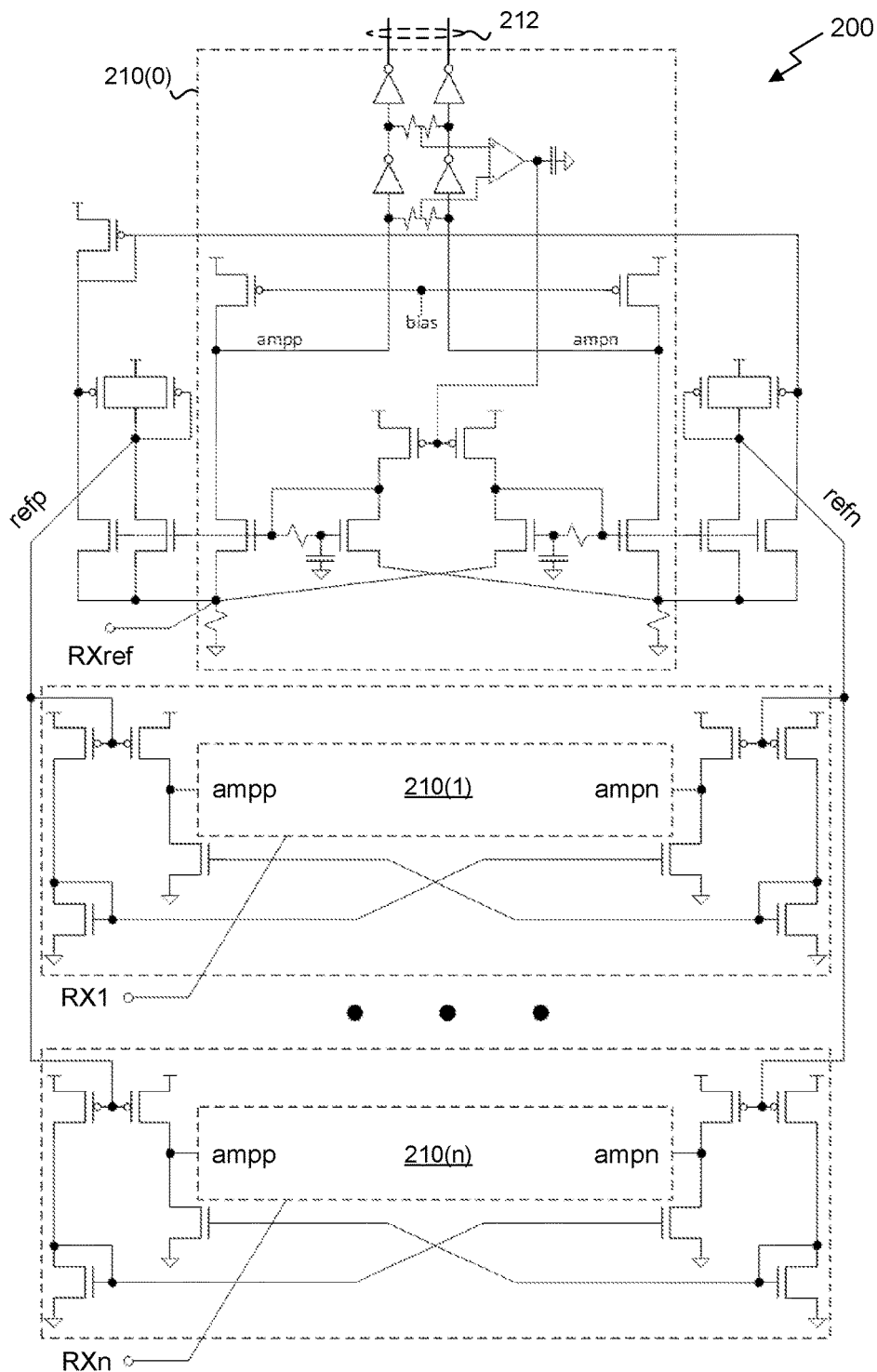
FIG. 2 illustrates an exemplary reference forwarding circuit, in accordance with one embodiment.

FIG. 2 illustrates an exemplary reference forwarding circuit 200, in accordance with one embodiment. Reference forwarding circuit 200 represents one approach to implementing input buffers 132 and 136 of FIG. 1A. The reference forwarding circuit 200 includes input buffers 210(0) through 210(n), corresponding in function to input buffer 136 and input buffers 132, respectively. Input buffer 210(0) is configured to generate a differential output signal 212 based on the reference input signal RXref. Input buffer 210(0) also generates a pseudo-differential compensation signal comprising signals refp and refn, corresponding to compensation signal 134. The pseudo-differential compensation signal represents an extracted noise signal from RXref. The pseudo-differential compensation signal is transmitted to input buffers 210(1) through 210(n) through a set of associated current mirrors.

Figure 3A:
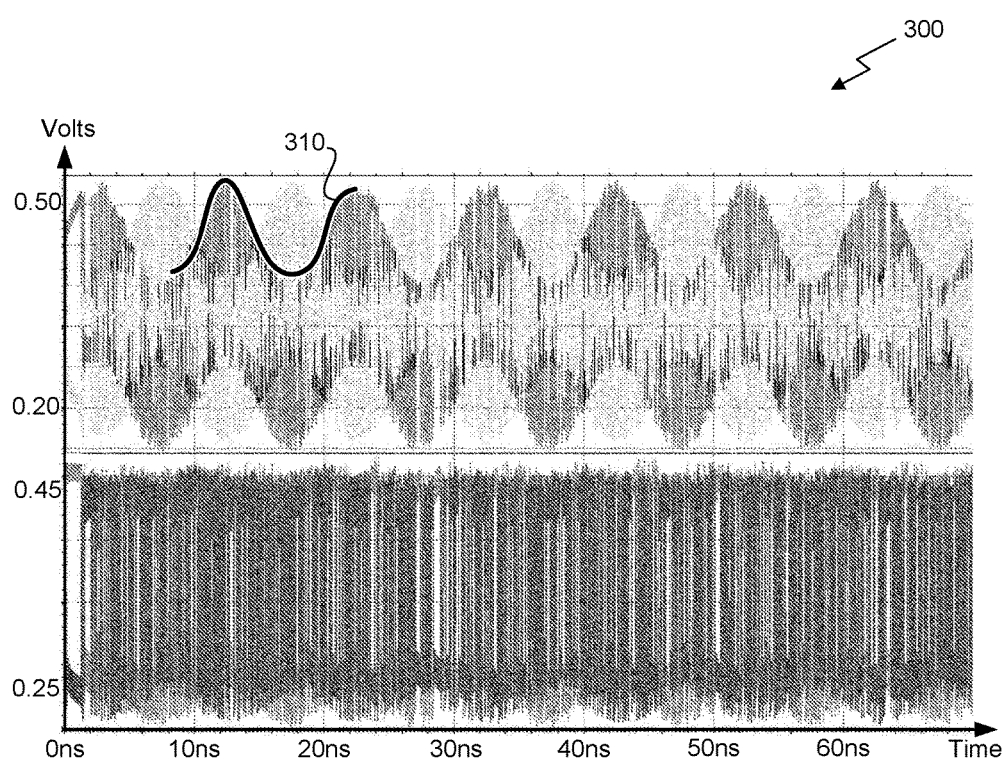
FIG. 3A illustrates a receiver output signal with and without reference forwarding, in accordance with one embodiment.

FIG. 3A illustrates a receiver output signal 300 with (bottom waveform) and without (top waveform) reference forwarding, in accordance with one embodiment. The waveforms represent simulated results of a reference forwarding system illustrated FIG. 1A. The simulation included a 75 mV 100 MHz noise signal modeled as relative noise between a local transmitter circuit ground at transmitter circuit 110 and a local receiver circuit ground at receiver circuit 130. Without reference forwarding, the noise signal 310 is apparent. However, with reference forwarding, the noise signal is substantially eliminated.

Figure 3B:
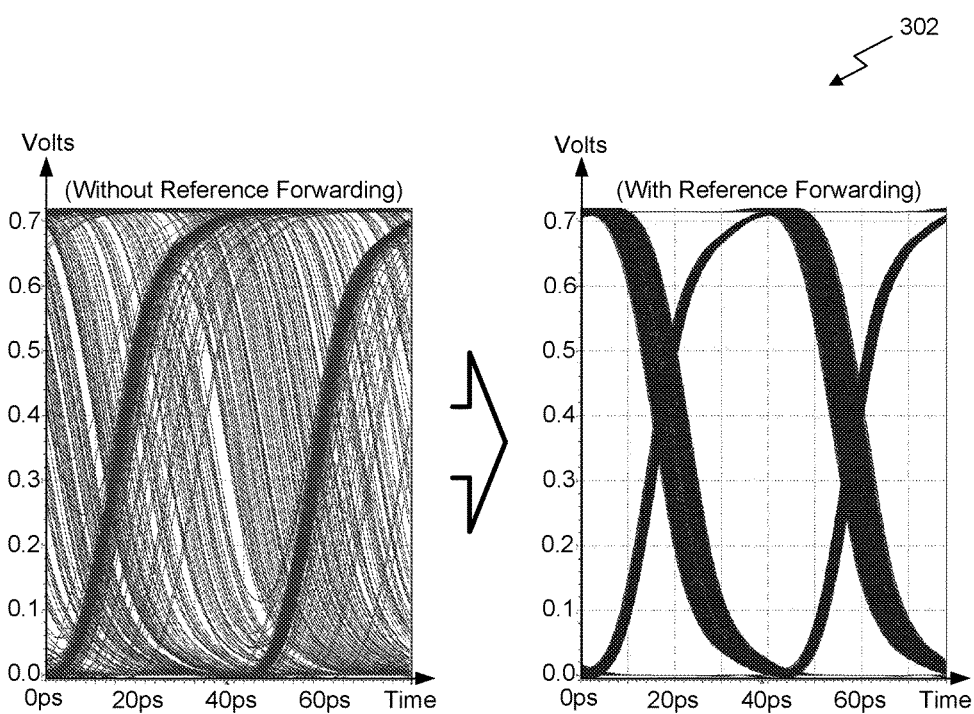
FIG. 3B illustrates a receiver output eye diagram with and without reference forwarding, in accordance with one embodiment.

FIG. 3B illustrates a receiver output eye diagram 302 with reference forwarding (right eye diagram) and without reference forwarding (left eye diagram), in accordance with one embodiment. While output signal 300 of FIG. 3A illustrates an overall noise signal envelope imposed on a plurality of signal transitions along a linear time line, eye diagram 302 illustrates an accumulated effect of a plurality of signal transitions superimposed within the same time window. The bit rate shown here is 25 Gbps, with each bit time occupying 40 ps. As shown, the eye diagram without reference forwarding offers little hope of reliable data transmission, while the eye diagram with reference forwarding is a very clean pattern for highly-reliable data transmission.

Figure 4A:
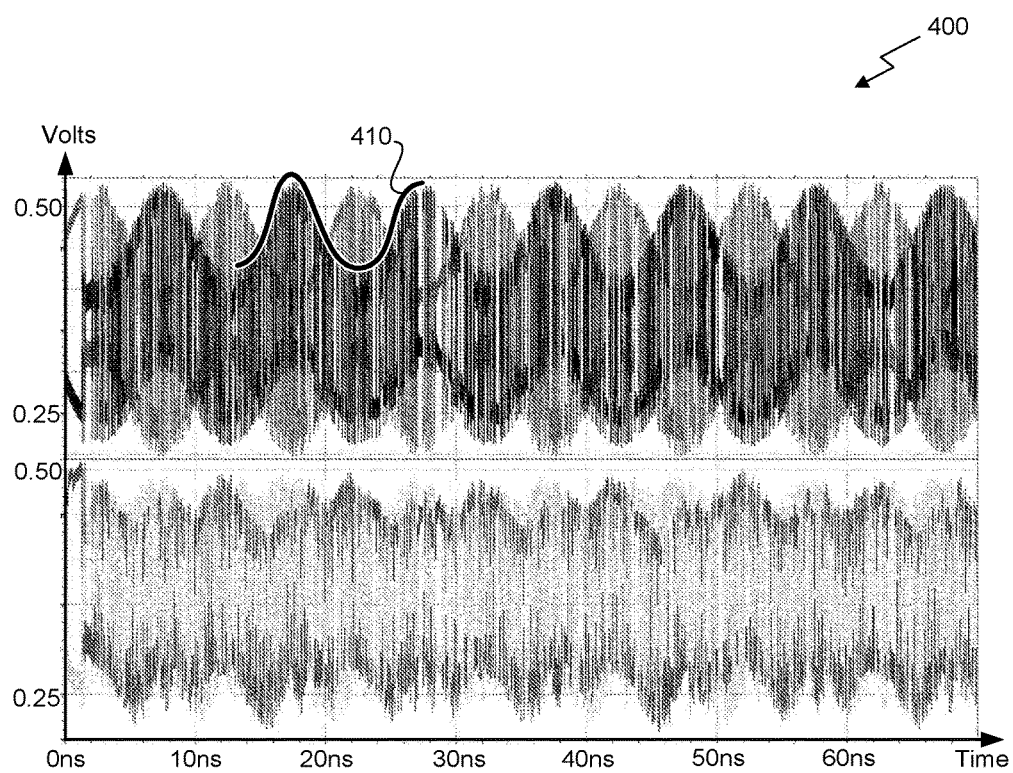
FIG. 4A illustrates a receiver output signal with and without digital control loop compensation using a reference lane, in accordance with one embodiment.

FIG. 4A illustrates a receiver output signal 400 with digital control loop compensation (bottom waveform) and without digital control loop compensation (top waveform) using a reference lane, in accordance with one embodiment. The waveforms represent simulated results of a reference forwarding system illustrated FIG. 1C. The simulation included a 75 mV 100 MHz noise signal modeled as relative noise between a local transmitter circuit ground at transmitter circuit 110 and a local receiver circuit ground at receiver circuit 130. Without digital control loop compensation a noise signal is vividly apparent. However, with digital control loop compensation, the noise signal is attenuated.

Figure 4B:
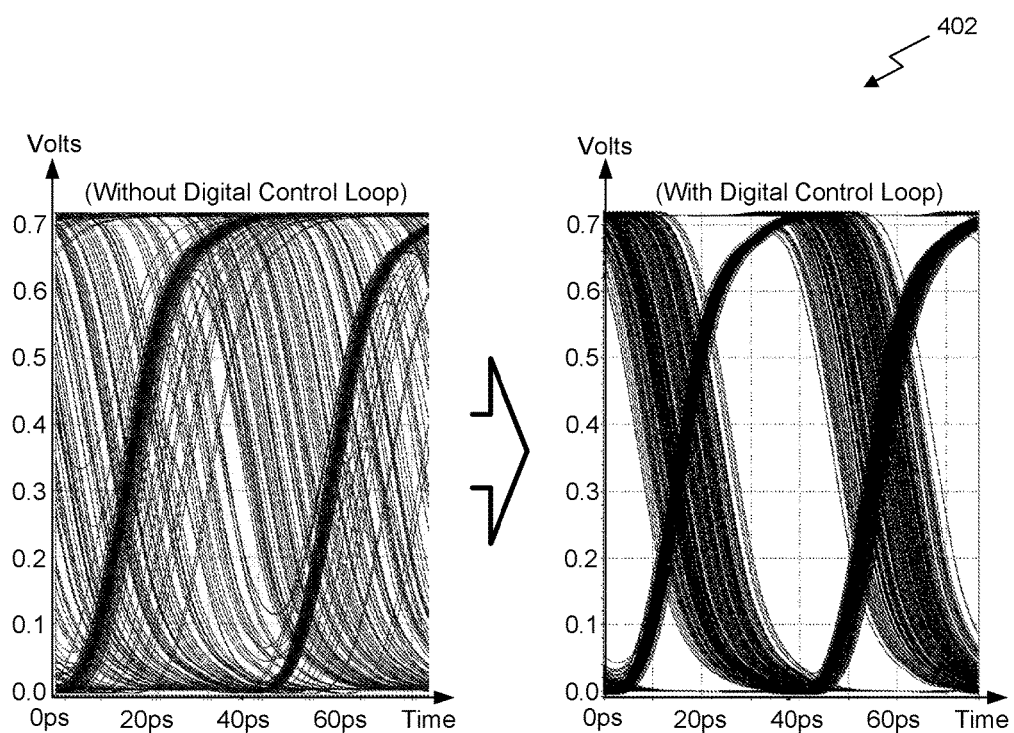
FIG. 4B illustrates a receiver output eye diagram with and without digital control loop compensation using a reference lane, in accordance with one embodiment.

FIG. 4B illustrates a receiver output eye diagram 402 with digital control loop compensation (right eye diagram) and without digital control loop compensation (left eye diagram) using a reference lane, in accordance with one embodiment.

While output signal 400 of FIG. 4A illustrates an overall noise signal envelope imposed on a plurality of signal transitions along a linear time line, eye diagram 402 illustrates an accumulated effect of a plurality of signal transitions superimposed within the same time window. The bit rate shown here is 25 Gbps, with each bit time occupying 40 ps. As shown, the eye diagram without digital control loop compensation offers little hope of reliable data transmission, while the eye diagram with reference forwarding is a relatively clean pattern for reliable data transmission. The simulation uses a 3.125 GHz sampling clock and the output of the sampler is used as an up/down input. A seventeen-state thermometer coded output drives coarse offset control of the receiver with the LSB step of about 10 mV.

Figure 5A:
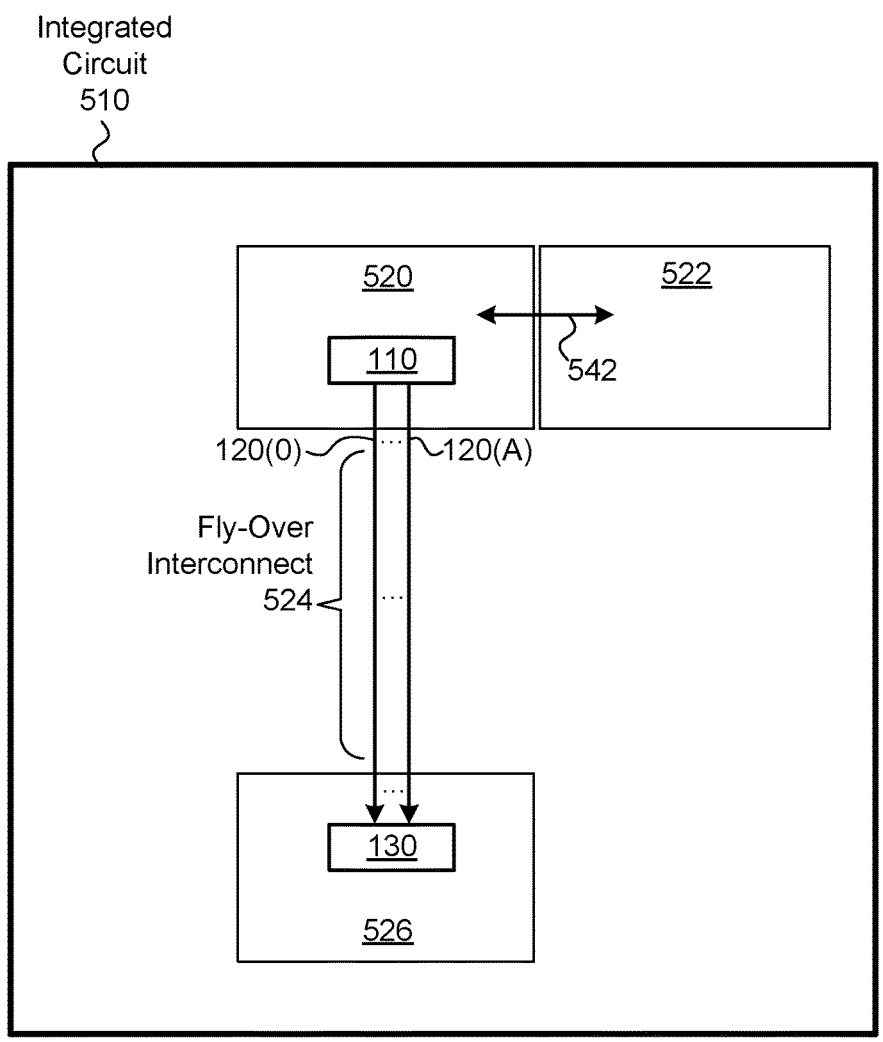
FIG. 5A illustrates a system comprising an integrated circuit and fly-over interconnect, in accordance with one embodiment.

FIG. 5A illustrates a system comprising an integrated circuit 510 and fly-over interconnect 524, in accordance with one embodiment. As shown, integrated circuit 510 includes circuit modules 520, 522, and 526, each fabricated within a local region of a single die within which the integrated circuit 510 is fabricated. Circuit module 520 may include an instance of transmitter circuit 110 of FIG. 1A, 1C, 1D, or 1E that is coupled to fly-over interconnect 524. Circuit module 526 may include an instance of receiver circuit 130, also coupled to fly-over interconnect 524. In one embodiment, fly-over interconnect 524 comprises interconnects 120, and fly-over interconnect 524 is configured to transmit single-ended signals from transmitter circuit 110 to receiver circuit 130. Certain circuit modules within integrated circuit 510 may also include local interconnects, such as local interconnect 542, which may implement any technically feasible signaling technique.

Figure 5B:
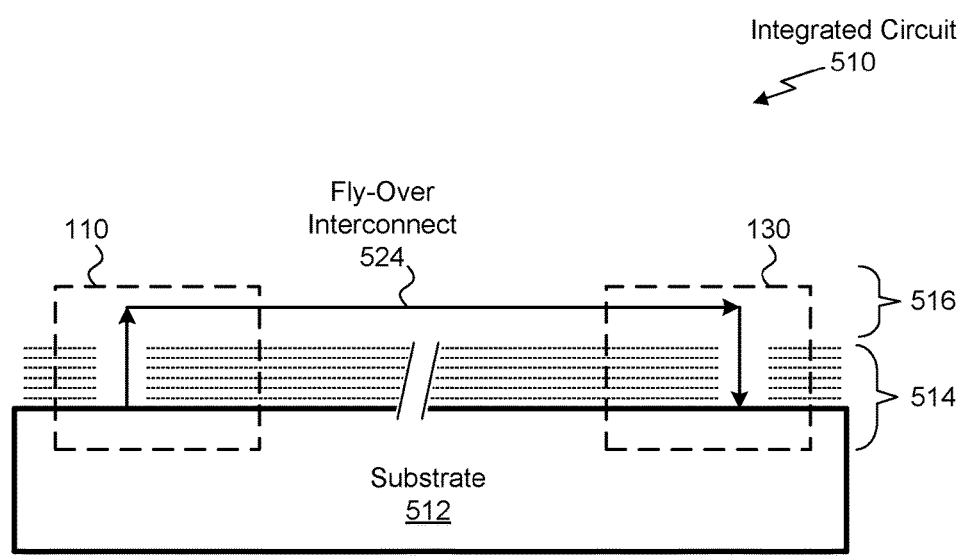
FIG. 5B illustrates a cross-section of an integrated circuit and a fly-over interconnect, in accordance with one embodiment.

FIG. 5B illustrates a cross-section view of an integrated circuit 510 and a fly-over interconnect 524, in accordance with one embodiment. As shown, integrated circuit 510 includes a substrate 512, active circuit layers 514, and upper metal layers 516. In one embodiment, the upper metal layers 516 are configured to implement fly-over interconnect 524. In alternative embodiments, any metal layers or any other conductive layers fabricated in conjunction with integrated circuit 510 may implement fly-over interconnect 524. Active circuit layers 514 may include diffusion layers fabricated within substrate 512, as well as layers fabricated at the surface of substrate 512 (metal layers, poly-silicon, dielectric layers, and other layers). In one embodiment, transmitter circuit 110 and receiver circuit 130 are disposed at opposite ends of fly-over interconnect 524.

Figure 5C:
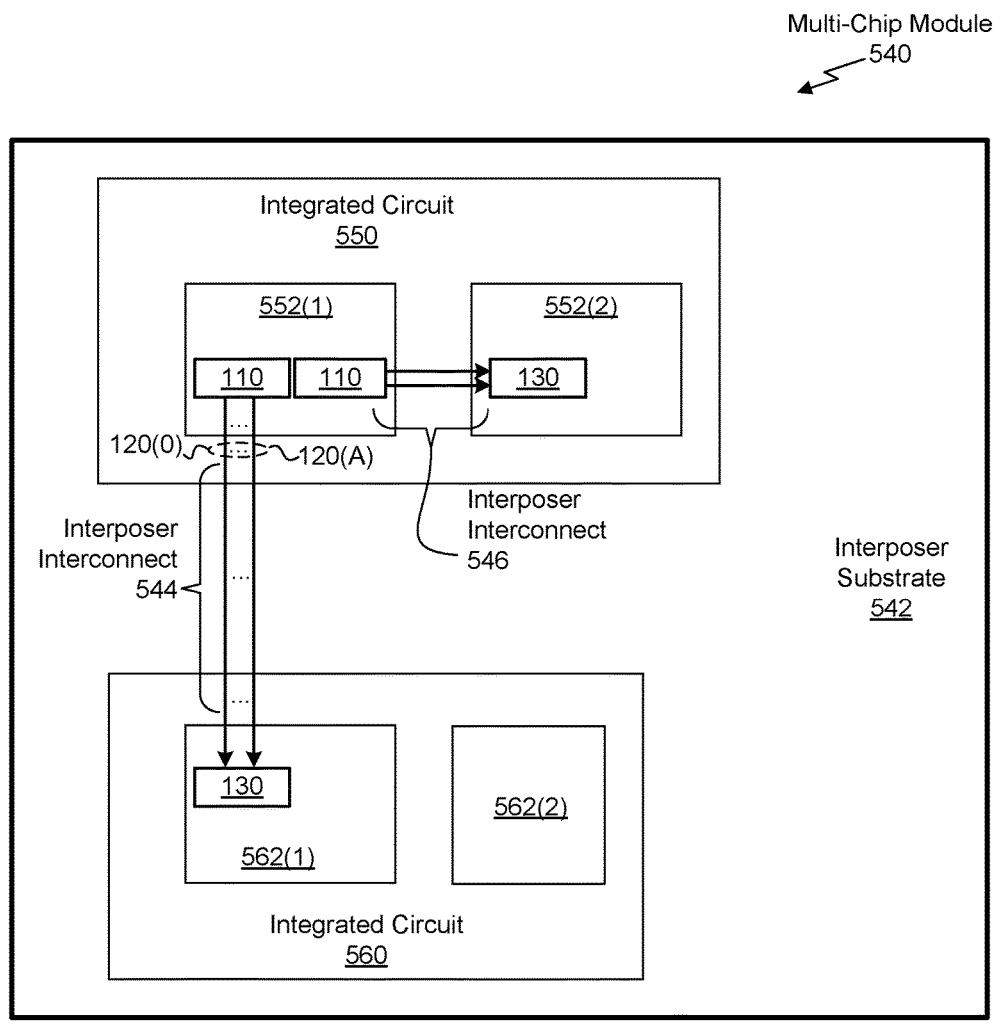
FIG. 5C illustrates a system comprising a multi-chip module with an interposer interconnect configured to couple a first integrated circuit to a second integrated circuit, in accordance with one embodiment.

FIG. 5C illustrates a system comprising a multi-chip module 540 with an interposer interconnect 544 configured to couple a first integrated circuit 550 to a second integrated circuit 560, in accordance with one embodiment. The interposer interconnect 544 may be fabricated from two or more conductive layers (e.g., wires) of an interposer substrate 542. For example, the interposer interconnect 544 may be fabricated as two different metal layers of the interposer substrate 542. Each integrated circuit 550, 560, and the interposer substrate 542 may be fabricated from a common material (e.g., silicon) or materials having a substantially identical thermal coefficient of expansion. The multi-chip module 540 may further include a ball grid array (BGA) package comprising a ceramic substrate, an organic substrate, a silicon substrate, an epoxy or plastic enclosure, or any technically feasible combination thereof. In one embodiment, the interposer substrate 542 is coupled to the BGA package. Certain electrical signals may be coupled from the interposer substrate 542 to input/output pins on the BGA package.

Integrated circuit 550 includes circuit modules 552, and integrated circuit 560 includes circuit modules 562. Circuit module 552(1) may include a first instance of transmitter circuit 110 coupled to interposer interconnect 544, and a second instance of transmitter circuit 110 coupled to an interposer connection 546. Each instance of transmitter circuit 110 may be coupled through an interconnect (e.g., interposer interconnect 544, 546) to a corresponding instance of receiver circuit 130. Electrical connections between each integrated circuit 550, 560 and the interposer substrate 542 may be implemented as controlled collapse chip connection (C-4) connectors or joints (e.g., conductive balls). The instances of transmitter circuit 110, instances of receiver circuit 130, and interposer interconnects 544, 546 collectively provide high-speed chip-to-chip data communication between integrated circuit 550 and integrated circuit 560.

Figure 5D:
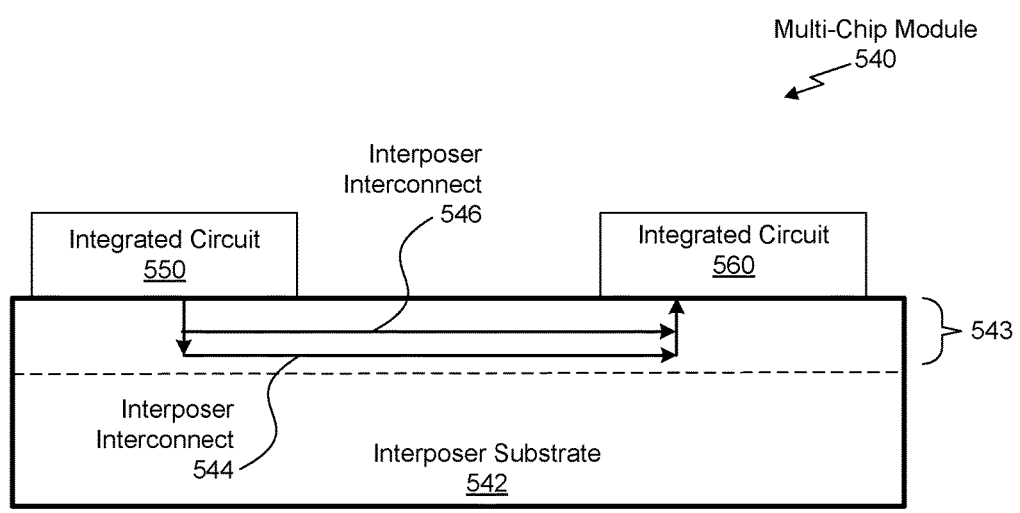
FIG. 5D illustrates a cross-section of a multi-chip module and interposer interconnect, in accordance with one embodiment.

FIG. 5D illustrates a cross-section of multi-chip module 540 and interposer interconnect 544, in accordance with one embodiment. Interposer substrate 542 may include a set of metal interconnect layers 543, including associated via layers for the metal layers. In one embodiment, metal layers 543 are configured to implement interposer interconnect 544 and/or interposer interconnect 546.

Figure 5E:
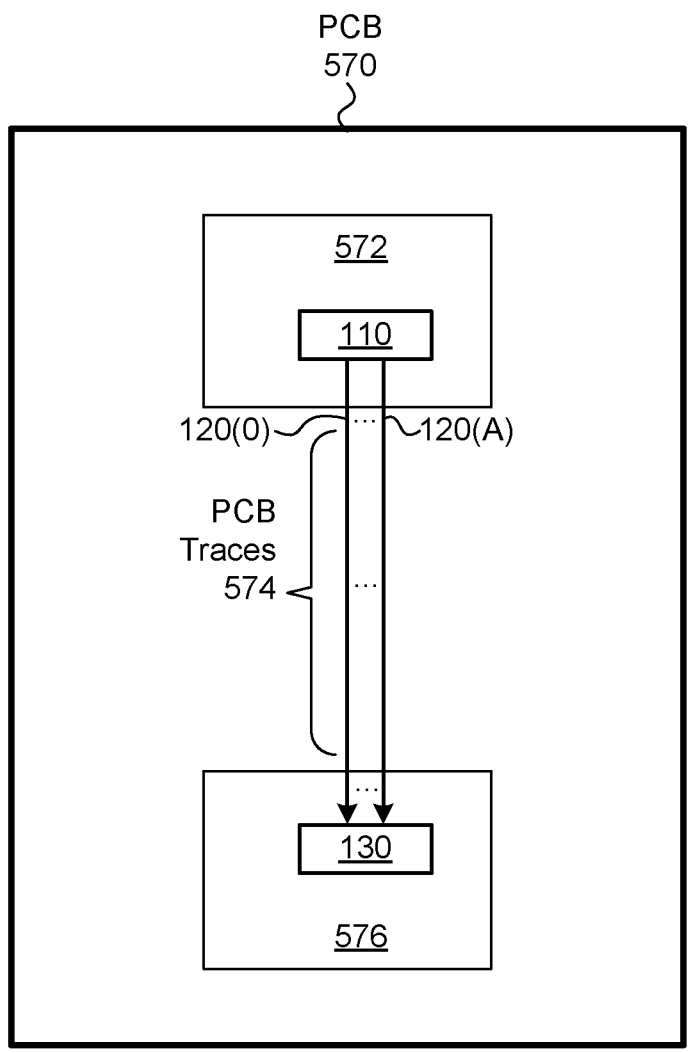
FIG. 5E illustrates a printed circuit board (PCB) including a first integrated circuit configured to communicate with a second integrated circuit through a set of PCB traces, in accordance with one embodiment.

FIG. 5E illustrates a printed circuit board (PCB) 570 including a first integrated circuit 572 configured to communicate with a second integrated circuit 576 through a set of PCB traces 574, in accordance with one embodiment. The PCB 570 is fabricated to include the set of PCB traces 574. The first integrated circuit 572 and the second integrated circuit 576 may be coupled to (e.g., soldered, clipped) the PCB 570, with pins or solder bumps forming electrical connections with respective PCB traces 574. Integrated circuit 572 may include a first instance of transmitter circuit 110 coupled to PCB traces 574, and integrated circuit 576 may include a first instance of receiver circuit 130, coupled to corresponding PCB traces 574. In one embodiment, PCB traces 574 comprise interconnects 120, and PCB traces 574 are configured to transmit single-ended signals from transmitter circuit 110 to receiver circuit 130. Integrated circuits 572, 576 may include a substrate. The substrate may comprise an organic package or silicon interposer package, such as interposer substrate 542 of FIGS. 5C-5D.

A circuit, method, and system embodiment are disclosed that advantageously allow greater distance for a single-ended signal to be transmitted from a transmitter circuit and a receiver circuit compared to prior art solutions. Such greater distance may be a baseline requirement for chip-to-chip single-ended signaling through PCB interconnects. Furthermore a trade-off between greater distance and reduced signal amplitude (to reduce power consumption) is provided.

Figure 6:
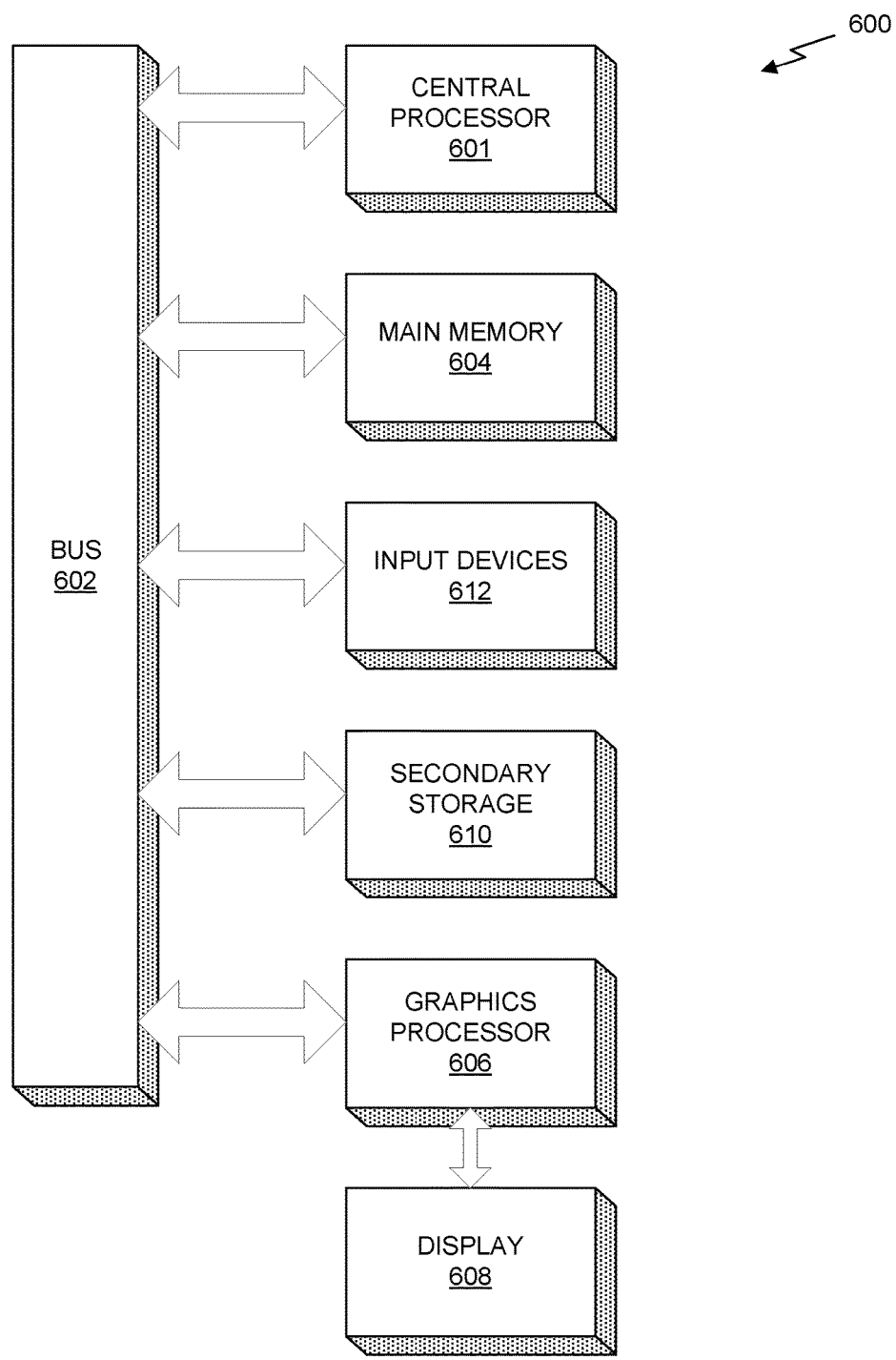
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

The exemplary system 600 may be configured to include one or more instances of single-ended signal transmission system 100, single-ended signal transmission system 102, single-ended signal transmission system 104, or single-ended signal transmission system 106. For example, graphics processor 606 may include the one or more instances configured to provide chip-to-chip and/or module-to-module communication within the system.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A single-ended signal transmission system, comprising:
   a transmitter circuit configured to:
      transmit a reference signal on a first channel; and
      transmit a single-ended signal on a second channel;
   a receiver circuit that is configured to:
      receive the reference signal combined with first noise on the first channel;
      receive the single-ended signal combined with second noise on the second channel;
      sample the reference signal combined with the first noise to determine the first noise; and
      combine the first noise and the single-ended signal combined with the second noise to restore the single-ended signal.

2. The single-ended signal transmission system of claim 1, wherein the reference signal is a reference voltage level.

3. The single-ended signal transmission system of claim 1, wherein the reference signal is a clock signal.

4. The single-ended signal transmission system of claim 1, wherein the sampling comprises producing an analog signal representing the first noise.

5. The single-ended signal transmission system of claim 1, wherein the sampling comprises producing a digital signal representing the first noise.

6. The single-ended signal transmission system of claim 1, wherein the sampling comprises producing a differential signal representing the first noise.

7. The single-ended signal transmission system of claim 1, wherein the sampling comprises sampling the reference signal combined with the first noise at a frequency that is uncorrelated with a switching frequency of the single-ended signal.

8. The single-ended signal transmission system of claim 1, wherein the first noise is processed before being combined with the single-ended signal combined with the second noise.

9. The single-ended signal transmission system of claim 8, wherein a transfer function used to process the first noise is programmable.

10. The single-ended signal transmission system of claim 1, wherein the reference signal is a DC-balanced signal.

11. The single-ended signal transmission system of claim 1, further comprising additional channels, wherein
    the transmitter circuit is further configured to transmit additional single-ended signals on the additional channels and
    the receiver circuit is further configured to:
    receive the additional single-ended signals combined with additional noise on the additional channels; and
    combine the first noise and each one of the additional single-ended signals combined with the additional noise to restore the additional single-ended signals.

12. The single-ended signal transmission system of claim 11, wherein the first noise is processed before being combined with the additional single-ended signals combined with the additional noise.

13. The single-ended signal transmission system of claim 12, wherein additional transfer functions used to process the first noise are programmable for each one of the additional single-ended signals.

14. The single-ended signal transmission system of claim 1, wherein the first channel is provided by a wire.

15. The single-ended signal transmission system of claim 1, wherein the reference signal is a single-ended signal.

16. A method for reference noise compensation, comprising:
    transmitting, by a transmitter circuit, a reference signal on a first channel;
    transmitting, by the transmitter circuit, a single-ended signal on a second channel;
    receiving, by a receiver circuit, the reference signal combined with first noise on the first channel;
    receiving, by the receiver circuit, the single-ended signal combined with second noise on the second channel;
    sampling, by the receiver circuit, the reference signal combined with the first noise to determine the first noise; and
    combining the first noise and the single-ended signal combined with the second noise to restore the single-ended signal.

17. The method of claim 16, wherein the reference signal is a reference voltage level.

18. The method of claim 16, wherein the reference signal is a clock signal.

19. The method of claim 16, wherein the sampling comprises sampling the reference signal combined with the first noise at a frequency that is uncorrelated with a switching frequency of the single-ended signal.

20. The method of claim 16, wherein the first noise is processed before being combined with the single-ended signal combined with the second noise.

* * * * *